F. LAMBERT.
APPARATUS FOR GRANULATING CLAY.
APPLICATION FILED OCT. 25, 1911.
1,073,425.
Patented Sept. 16, 1913.
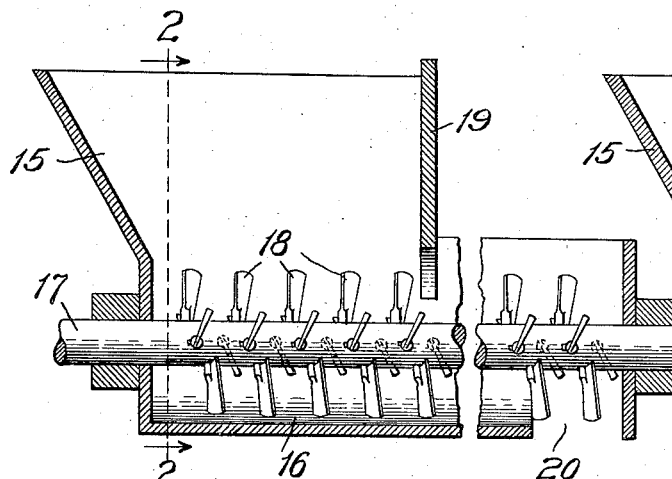
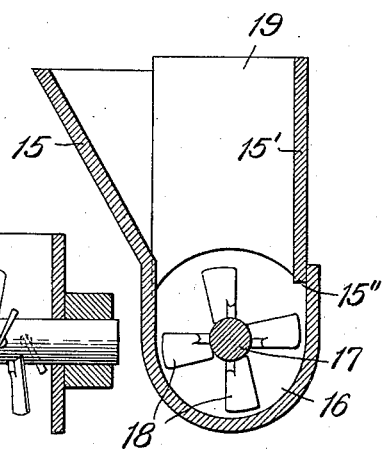
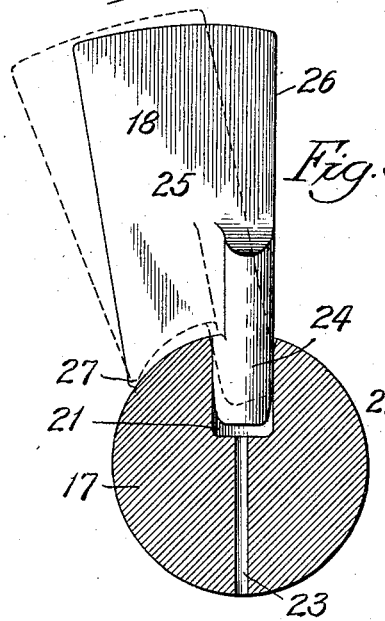
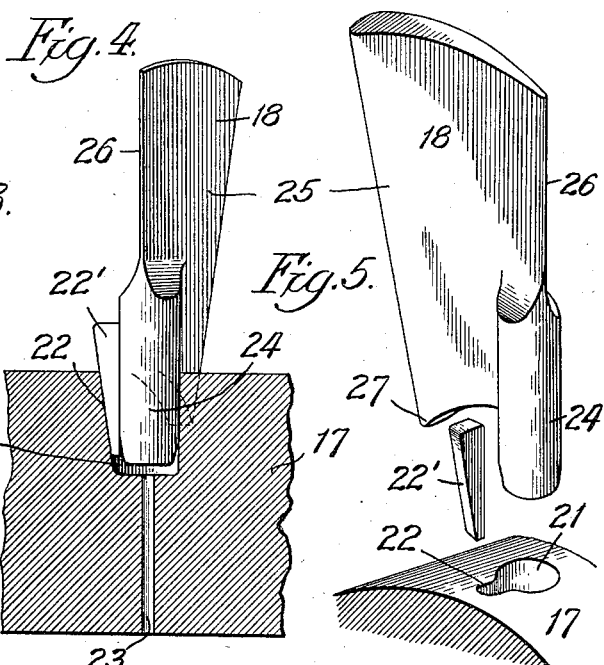
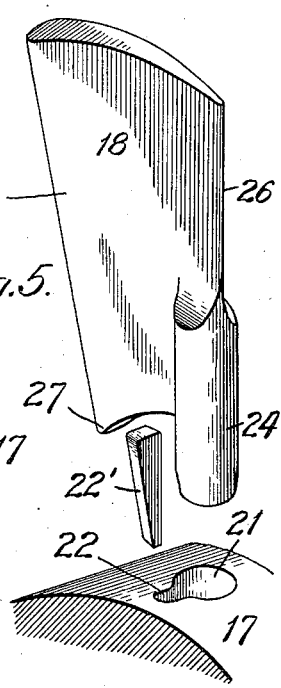
Witnesses:
John Enders,
Henry A. Parks
Inventor:
Frank Lambert,
by Sheridan, Wilkinson, Scott & Richmond,
Attys.

UNITED STATES PATENT OFFICE.

FRANK LAMBERT, OF CHICAGO, ILLINOIS.

APPARATUS FOR GRANULATING CLAY.

1,073,425.  Specification of Letters Patent.  Patented Sept. 16, 1913.

Application filed October 25, 1911. Serial No. 656,579.

*To all whom it may concern:*

Be it known that I, FRANK LAMBERT, a citizen of the United States, residing at Chicago, in the county of Cook and State of Illinois, have invented certain new and useful Improvements in Apparatus for Granulating Clay, of which the following is a specification.

The principal object of my invention is to provide an improvement in apparatus for granulating clay to prepare it for the manufacture of bricks or other articles.

Another object of my invention is to provide an improved clay knife to be used in connection with apparatus for granulating clay.

Still another object of my invention is to provide a clay knife that shall reduce to a minimum the breakage by contact with stones in the clay.

These and other objects and advantages of my invention will be made apparent in the following specification and claims, taken in connection with the accompanying drawings.

For the purpose of clearly explaining my invention and its utility, I have illustrated one specific embodiment thereof in the accompanying drawings, and I now proceed to describe the same.

Figure 1 is a longitudinal section of a clay granulator with which my improved knife may be employed. Fig. 2 is a transverse section of the same on the line 2—2 of Fig. 1. Fig. 3 is an elevation of one of the knives with a cross section of the shaft in which it is mounted. Fig. 4 is a fragmentary longitudinal section of the shaft with an edge elevation of one of the knives mounted on the shaft; and Fig. 5 is a perspective view of the knife and associated elements spaced apart slightly.

The clay granulator comprises a hopper 15 with downwardly converging side walls, and at the bottom thereof is a trough 16, the lower part of which is of semi-cylindrical contour. A heavy shaft 17 lies in the axis of this trough, mounted in journal bearings at the ends, so that it is adapted to rotate. This shaft 17 carries knives 18 in sockets, arranged in a helical course around the shaft, the knives extending from the shaft far enough to almost touch the bottom of the trough 16. The hopper is bounded at the right—as viewed in Fig. 1—by an end wall 19, the lower edge of which is spaced from the ends of the revolving knives just enough to give a suitable clearance. The trough 16 has an opening at its end, which is designated as 20. The blades 18 are set uniformly at a slight inclination from planes perpendicular to the axis of the shaft 17, so that in revolving they not only cut the clay but advance it slowly along the trough to the right.

It will be observed that the planes of the knives cut across the helix drawn on the surface of the shaft 17 through the successive sockets therein. This arrangement insures that the entire body of clay will not be simply screwed forward in the bottom of the trough 16, but that it will be chopped at the same time that it is advanced to the right along the trough 16 as viewed in Fig. 1. As will be readily understood the device is fed by dumping clay into the hopper 15; this clay is granulated and moved along the trough 16, and discharges through the opening 20.

The shaft 17 has holes or sockets 21 drilled in radially a little less than half the diameter and in these the knives are mounted. Adjacent to each socket there is a slot 22, which is a keyway, and a wedge key can be driven in this slot to hold the knife in place. Each socket 21 has an extension hole 23 of reduced size which goes diametrically through the shaft 17. The purpose of this extension hole 23 is to permit introducing a punch so that the knife can be driven out when desired, as, for example, when a knife is worn out and must be replaced by a new one.

Each knife comprises a blade 25 and a stem or shank 24 adapted to go in the socket 21. This blade has its cutting edge at 26, the opposite edge being much thicker so as to give the requisite strength to the knife. The cutting edge 26 of the knife extends in a direction that is approximately radial to the shaft 17, and hence at any instant the edge of the knife is substantially at a right angle to its direction of movement. It accordingly follows that the knife tends to cut directly into masses of clay which it meets and has less tendency to push them out toward the end of the knife than it would have if the edge of the knife was inclined backwardly with respect to a radius to some point of the edge. The heel 27 rests against the shaft 17 and thus when the knife, rotating in the direction of the arrow 28 in Fig. 3, strikes against a stone, instead of the knife breaking off, it will act as a lever with its fulcrum at 27, and the force of the stone acting against the knife in a direction opposite to the arrow 28 will pull the shank 24 out of its socket in a radial direction, as indicated by the dotted lines in Fig. 3. As the shank 24 moves radially out of its socket, it carries the key 22' with it and thus the shank 24 is instantly loosened in its socket 21. Thereafter the attendant can quickly replace the knife securing it in place by means of the key 22'. Sometimes the shank 24 may be bent a little in withdrawing it as just described, but if this is the case, it can be taken to an anvil and readily straightened.

The side of the hopper 15 toward which the knives 18 revolve is designated 15' in Fig. 2, and it has a slight overhang 15''. This prevents the clay from banking up on this side of the hopper as it would otherwise have a tendency to do.

With knives not having the heel or fulcrum 27 at a suitable distance behind the shank, a great many are broken by striking against stones in the clay. Usually they break off close to the surface of the shaft 17 leaving the stub shank 24 tight in its socket 21. It is then necessary for the attendant to turn the shaft over and by means of a punch, introduced through the hole 23, drive out the stub shank, then rotate the shaft so as to make the socket 21 accessible, and put a new knife in place. By my improvement not only are the knives kept from being broken in most instances, but less time is required to replace a knife, because with my improved blades there are no stub shanks to be punched out before the blade is reset.

There may be occasions when it will be desired to remove a knife that has not been loosened in use, as, for example, when its edge has become dulled by a long continued use. Such a knife should be removed in order to be sharpened. For this purpose the holes 23 will be found useful. A punch can be passed through the proper hole 23 and by driving on the end the shank 24 can be punched out of the socket 21.

It will be seen that I have provided an improved combination of elements by which the blade acts directly at right angles to its edge upon the clay, and is thus more effective than blades whose direction of motion is not at right angles to the edge. Another advantage of my improved blade is that when it comes in contact with stones it pulls out instead of breaking, and thus the expense of mending broken blades or renewing them is avoided. Another advantage is that it takes much less time to replace a blade that has pulled out than it does to remove the remnant of a broken blade and replace a new one.

It will be observed that it is an essential feature of my device that the connection of the knife to the shaft shall be detachable or such that while moderate forces will not displace the knife with relation to its shaft, nevertheless forces of considerable magnitude acting outwardly on the shank of the knife in a radial direction will detach it. Hence I must have what I call a detachable or yielding fastening or connection. It will also be seen that it is a feature of my invention to have two connections between the entire knife and the main shaft. One of these connections consists in fastening the shaft of the knife into the socket in the shaft. The other connection consists of having the heel of the knife rest against the shaft. This latter connection may be termed a thrust connection, because it is functional only to resist a thrust, in other words, it is not a connection that ties the parts together.

I claim:

1. In a device of the class described, a shaft having a radial socket therein, in combination with a knife having a shank fitting in said socket, said knife also having a heel in contact with the shaft at a point back of the edge of the knife, the distance of said point of contact of the heel with the shaft from the said shank being greater than the diameter of the shank, and wedging fastening means beside said shank.

2. In a device of the class described, a shaft having a radial socket therein, in combination with a knife having a shank fitting in said socket, and yielding wedging means fastening the said knife in said socket, said knife also having a heel in contact with the shaft at a point behind the socket and behind the edge of said knife.

3. In a device of the class described, a shaft having a radial socket, in combination with a clay knife having a shank in said socket, means for securing said shank in said socket, said clay knife having its cutting edge approximately on a radial line through the said socket and having a backwardly projecting heel resting on the surface of the shaft back of the socket and behind the edge of said knife.

4. In a device of the class described, a rotatable shaft, a knife projecting therefrom, and detachable means fastening the knife to the shaft, said means being adapted to yield without rupture to an excessive force applied radially to said knife and said knife also having a thrust bearing with the shaft at a point opposite its cutting edge.

5. In a device of the class described, a shaft having a radial socket therein, in combination with a knife having a shank fitting in said socket, said knife also having a heel in contact with the shaft at a point on the opposite side of the socket with respect to the side to which the edge of the knife is directed, said shaft having a keyway therein beside said socket, and a key in said keyway, the face of the key away from the shank and the side of the shank opposite the key diverging outwardly from the shaft.

6. In a device of the class described, a shaft having a radial socket therein, in combination with a knife having a shank fitting in said socket, and a wedge beside said shank fastening it in said socket, said knife also having a heel in contact with the shaft at a point on the opposite side of the socket from the direction in which the edge of the knife is directed.

7. In a device of the class described, a shaft having a radial socket therein, in combination with a knife having a shank fitting in said socket, and wedging means beside said shank fastening it in said socket, said knife also having a heel in contact with the shaft at a point behind the socket with respect to the direction of rotation of the shaft, said wedging means being adapted to become detached by a radial pull outwardly on said shank.

In testimony whereof, I have subscribed my name.

FRANK LAMBERT.

Witnesses:
 HENRY A. PARKS,
 ANNA L. WALTON.

Copies of this patent may be obtained for five cents each, by addressing the "Commissioner of Patents, Washington, D. C."